(12) United States Patent
Nonaka

(10) Patent No.: US 7,333,142 B2
(45) Date of Patent: Feb. 19, 2008

(54) POWER SUPPLY APPARATUS AND ACTUATOR CONTROL APPARATUS

(75) Inventor: Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 912 days.

(21) Appl. No.: 10/456,033

(22) Filed: Jun. 6, 2003

(65) Prior Publication Data

US 2003/0227561 A1 Dec. 11, 2003

(30) Foreign Application Priority Data

| Jun. 10, 2002 | (JP) | .................... 2002-168547 |
| Jun. 12, 2002 | (JP) | .................... 2002-171626 |
| Dec. 6, 2002  | (JP) | .................... 2002-355611 |

(51) Int. Cl.
*H04N 5/225* (2006.01)
*G02B 13/16* (2006.01)

(52) U.S. Cl. .................. 348/335; 363/15; 363/21.1; 363/21.11

(58) Field of Classification Search ................ 348/335; 363/15, 21.1, 21.11
See application file for complete search history.

(56) References Cited

U.S. PATENT DOCUMENTS 4,814,965 A * 3/1989 Petersen .................. 363/65

2003/0174005 A1 * 9/2003 Latham et al. ............. 327/172

FOREIGN PATENT DOCUMENTS

| JP | 60-019215  | 1/1985  |
| JP | 06-205584  | 7/1994  |
| JP | 2000-267010 | 9/2000  |
| JP | 2001-273040 | 10/2001 |

OTHER PUBLICATIONS

Japanese Office Action for Application No. 2002-168547, mailed Oct. 31, 2006 (2 pgs.) with Translation (3 pgs.).
Japanese Office Action, "Final Notice of Rejection" for JP 2002-168547, mailed Feb. 20, 2007 (2 pgs.) (with translation, 3 pgs.).

* cited by examiner

*Primary Examiner*—James M. Hannett
(74) *Attorney, Agent, or Firm*—Straub and Pokotylo; John C. Pokotylo (57) ABSTRACT

In accordance with the switching operation of a switching section, current is made to flow from a battery to an inductor repeatedly. A voltage generated at the inductor is smoothed by a condenser and then input to a regulator. A D/A converter within a CPU monitors the input to the regulator, and an output voltage of the regulator stabilizes a reference voltage of the D/A converter.

4 Claims, 10 Drawing Sheets

POWER SUPPLY APPARATUS AND ACTUATOR CONTROL APPARATUS

CROSS-REFERENCE TO RELATED APPLICATIONS

This application is based upon and claims the benefit of priority from the prior Japanese Patent Applications No. 2002-168547, filed Jun. 10, 2002; No. 2002-171626, filed Jun. 12, 2002; and No. 2002-355611, filed Dec. 6, 2002, the entire contents of all of which are incorporated herein by reference.

BACKGROUND OF THE INVENTION

1. Field of the Invention

This invention relates to a camera which includes a power supply apparatus for applying, for example, different output voltages separately to a plurality of electrodes and a variable shape mirror with a reflecting surface whose shape varies with the output voltages applied to the electrodes. More particularly, this invention relates to a power supply apparatus and an actuator control apparatus which make the circuit size smaller and realize a good controllability.

2. Description of the Related Art

In recent years, so-called electronic cameras have been popularized. In electronic cameras, an image pickup optical system forms a subject image on a semiconductor imaging element, such as a CCD two-dimensional image sensor, thereby converting the image into an electric signal. The image data about the subject image thus obtained is recorded into a recording medium, such as a semiconductor memory or a magnetic disk.

Electronic cameras of this type have a lens for forming the subject image on the semiconductor imaging element. Most of them use a glass lens whose refractive index and shape are less liable to change due to a change in the temperature or humidity. In recent years, there have been strong demands for lighter weight and lower cost. For this reason, use of plastic lenses in place of glass lenses has been examined. However, since the image formation characteristic of the plastic lens is liable to deteriorate due to a change in the temperature and humidity, use of the plastic lens requires any suitable measure to be taken against changes in the temperature and humidity.

With this backdrop, the applicant of this application has proposed a variable shape mirror element which has an optical reflecting surface and is capable of electrically controlling the shape of the reflecting surface by electrostatic force as written in, for example, Japanese Patent Application No. 11-72557 (Jpn. Pat. Appln. KOKAI Publication 2000-267010). Use of the variable shape mirror element enables a change in the optical characteristic of the plastic lens due to a change in the temperature and humidity to be compensated for by changing the shape of its reflecting surface. Therefore, it is possible to meet the demands for lighter weight and lower cost.

To control the shape of the reflecting surface of the variable shape mirror, that is, to perform control so as to obtain a shape that presents the desired optical characteristic, it is necessary to apply various voltages to a plurality of electrodes the variable shape mirror has. To make the amount of displacement larger, several tens of volts have to be applied.

With the recent trend toward making portable apparatuses smaller, many attempts have been made to cause the apparatus to operate properly for a long time from a small-capacity battery capable of generating only a low voltage. One technique for operating the apparatus on a low voltage for a long time was to use a DC/DC converter.

On the other hand, to make the apparatus smaller, it is necessary to reduce the number of parts. The applicant of this application has constructed a DC/DC converter that provides on/off control of one of the ports of a microcontroller for controlling the entire apparatus without using a special oscillator and uses inductor.

In recent years, microcontrollers have been made smaller in chip size as a result of advances in microfabrication technology. They have also been manufactured at lower cost. The limitation of voltage resistance due to microfabrication is becoming an important control item. Specifically, to use the latest, small, low-cost device, it is essential to invent a device to prevent the power supply voltage from rising above a specific voltage.

On the other hand, it goes without saying that it is necessary to invent a device to control the DC/DC converter more accurately according to the situation and suppress the power consumption to lengthen the service life of the battery, thereby increasing the user's satisfaction level.

BRIEF SUMMARY OF THE INVENTION

The feature of the present invention is to provide a power supply apparatus and an actuator control apparatus which make the circuit size smaller and realize a good controllability.

According to a first feature of the present invention, there is provided a power supply apparatus with a plurality of output terminals, comprising: a reference signal generator which generates a ramp signal; a plurality of switches one end of each of which is connected in common to the reference signal generator and the other end of each of which is connected to the plurality of output terminals; and a controller which is connected so as to control the plurality of switches, closes the plurality of switches in response to the start of the ramp signal, generates respective timing signals after a plurality of specific times have elapsed since the start of the ramp signal, and opens the respective switches according to the timing signals.

According to a second feature of the present invention, there is provided a power supply apparatus with a plurality of output terminals, comprising: a booster circuit which is applied to a power supply unit for a flash device in a camera; a plurality of switches one end of each of which is connected in common to the output of the booster circuit and the other end of each of which is connected to the plurality of output terminals; and a controller which is connected so as to control the plurality of switches, closes the plurality of switches in response to the start of a boost operation of the booster circuit, generates respective timing signals after a plurality of specific times have elapsed since the start of the boost operation, and opens the respective switches according to the timing signals.

According to a third feature of the present invention, there is provided a control apparatus for an electrostatic actuator with a plurality of segment electrodes, comprising: a power supply apparatus including a reference signal generator which generates a ramp signal, a plurality of switches one end of each of which is connected in common to the reference signal generator and the other end of each of which is connected to the plurality of output terminals, and a controller which is connected so as to control the plurality of switches, closes the plurality of switches in response to the start of the ramp signal, generates respective timing signals after a plurality of specific times have elapsed since the start of the ramp signal, and opens the respective switches according to the timing signals, wherein the plurality of output terminals are connected to the plurality of segment electrodes in a one-to-one correspondence.

According to a fourth feature of the present invention, there is provided a control apparatus for an electrostatic actuator with a plurality of segment electrodes, comprising: a power supply apparatus including a reference signal generator which generates a ramp signal, a plurality of switches one end of each of which is connected in common to the reference signal generator and the other end of each of which is connected to the plurality of output terminals, and a controller which is connected so as to control the plurality of switches, closes the plurality of switches in response to the start of the ramp signal, generates respective timing signals after a plurality of specific times have elapsed since the start of the ramp signal, and opens the respective switches according to the timing signals, wherein the controller gives a trigger to the reference signal generator, and the plurality of output terminals are connected to the plurality of segment electrodes in a one-to-one correspondence.

According to a fifth feature of the present invention, there is provided a control apparatus for an electrostatic actuator with a plurality of segment electrodes, comprising: a power supply apparatus including a reference signal generator which generates a ramp signal, a plurality of switches one end of each of which is connected in common to the reference signal generator and the other end of each of which is connected to the plurality of output terminals, and a controller which is connected so as to control the plurality of switches, closes the plurality of switches in response to the start of the ramp signal, generates respective timing signals after a plurality of specific times have elapsed since the start of the ramp signal, and opens the respective switches according to the timing signals, wherein the controller gives a trigger to the reference signal generator, the reference signal generator generates the ramp signal periodically, and the plurality of output terminals are connected to the plurality of segment electrodes in a one-to-one correspondence.

According to a sixth feature of the present invention, there is provided a control apparatus for an electrostatic actuator with a plurality of segment electrodes, comprising: a power supply apparatus with a plurality of output terminals including a booster circuit which is applied to a power supply unit for a flash device in a camera, a plurality of switches one end of each of which is connected in common to the output of the booster circuit and the other end of each of which is connected to the plurality of output terminals, and a controller which is connected so as to control the plurality of switches, closes the plurality of switches in response to the start of a boost operation of the booster circuit, generates respective timing signals after a plurality of specific times have elapsed since the start of the boost operation, and opens the respective switches according to the timing signals, wherein the plurality of output terminals are connected to the plurality of segment electrodes in a one-to-one correspondence.

According to a seventh feature of the present invention, there is provided a step-up power supply apparatus comprising: a switching step-up circuit which includes an inductor and a switch element; a voltage sensing section which senses the output voltage of the switching step-up circuit; and a control circuit which controls the timing of the application of a control pulse to the switch element on the basis of the output of the voltage sensing section.

According to an eighth feature of the present invention, there is provided a power supply circuit comprising: a switching section which causes current to flow from a battery to an inductor repeatedly; a smoothing circuit which smoothes a voltage generated at the inductor and inputs the smoothed voltage to a regulator; and a monitor circuit which monitors the output of the smoothing circuit, with a reference voltage of the monitor circuit being stabilized by the output voltage of the regulator.

According to a ninth feature of the present invention, there is provided a power supply circuit comprising: a microcontroller with the function of controlling the oscillation of a pulse signal with a specific pulse width; a DC/DC converter which uses a battery controlled by the generated pulse signal as a power supply; a regulator which converts the output of the DC/DC converter into a low voltage, wherein after a specific time has elapsed since the output of the pulse signal, the microcontroller compares the output of the regulator with the output of the DC/DC converter, thereby controlling the pulse signal.

In the present invention, the single power supply circuit generates various voltages applied to the electrodes the variable shape mirror has. A part of the power supply circuit is shared with the flash step-up power supply circuit. This makes it possible to make the circuit size smaller and improve the controllability, which is the object of the present invention.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, embodiments of the present invention will be explained.

Figure 1:
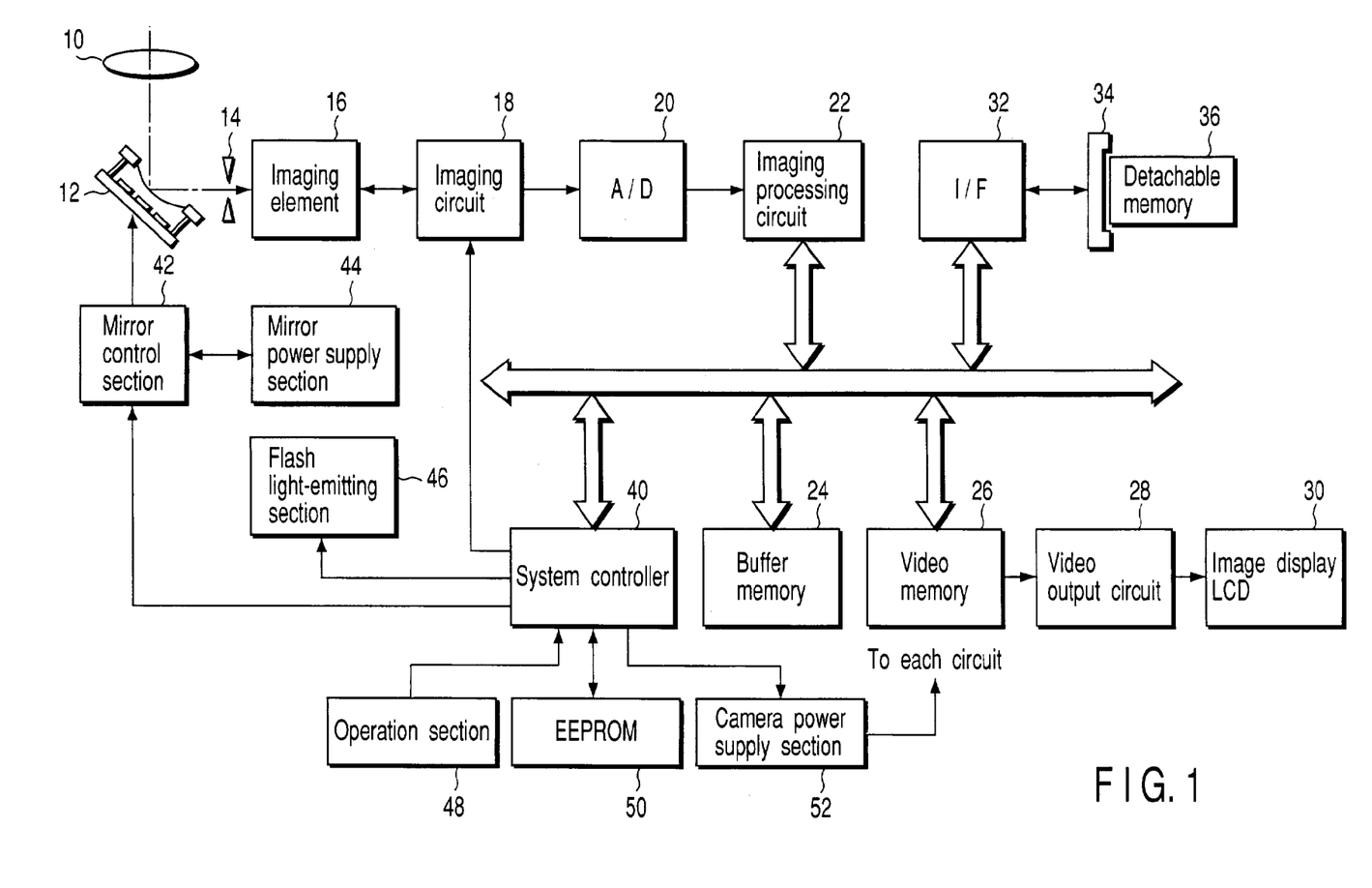
FIG. 1 is a block diagram of an electronic camera according to a first embodiment of the present invention.

FIG. 1 shows the configuration of an electronic camera according to a first embodiment of the present invention.

In FIG. 1, the light from a subject, or subject light, passes through an optical system 10 composed of a plurality of lenses and is reflected by the reflecting surface of an optical element having a variable shape mirror explained later, that is, a variable mirror 12. Thereafter, the amount of the subject light is controlled by a stop 14. The subject light passed through the stop 14 is caused to enter an imaging element 16, with the result that a subject image is formed on the imaging surface of the imaging element 16.

In the imaging element 16, a plurality of pixels for photoelectric conversion are arranged two-dimensionally in a matrix, thereby constituting an imaging surface. Then, a color filter is placed on the imaging surface to accumulate signal charges corresponding to the subject image formed on the imaging surface. An imaging circuit 18 is connected to the imaging element 16. The imaging circuit 18 controls exposure, reading, element shuttering gain adjustment, power supply, and others.

The output of the imaging element 16 is converted by an A/D converter 20 into a digital signal. The digital signal is then directed to an image processing section 22. In the image processing section 22, the digital signal is subjected to ISO sensitivity setting, auto white balance, luminance/chrominance signal generation, gamma processing, and others, thereby generating a color image signal in a specific format.

The color image signal generated by the image processing section 22 is stored temporarily into a buffer memory 24 composed of, for example, a DRAM. The image signal stored in the buffer memory 24 is transferred to a video memory 26, then passes through a video output circuit 28, and is displayed on an image display LCD 30. The image signal stored in the buffer memory 24 is read by an interface section 32, which subjects the image signal to, for example, a JPEG compression encoding process. The image signal subjected to the compression coding process is recorded into a detachable memory 36 housed in a card slot 34 in such a manner that it can be installed and removed in and from the slot 34 freely.

A system controller 40 supervises the overall control of the electronic camera, including the driving of each of the above sections. The system controller 40 drives the variable mirror 12 via a mirror control section 42. The mirror control section 42 takes out powers of various voltage values from the output of a mirror power supply section 44 and supplies the power, thereby driving the variable mirror 12 freely. The electronic camera of the first embodiment is characterized in that the mirror control section 42 and mirror power supply section 44 perform power supply control of the variable mirror 12 efficiently, which will be explained later.

Further connected to the system controller 40 are a flash light-emitting section 46 serving as a light source for illuminating the subject, an operation section 48, an EEPROM 50, a camera power supply section 52, and others.

The flash light-emitting section 46 has a capacitor capable of accumulating a specific amount of charge. The system controller 40 causes the capacitor to charge or discharge, thereby controlling the driving of the flash light-emitting section 46.

The operation section 48 generates an instruction signal to carry out various operations on the basis of the user's operation and transmits it to the system controller 40. The EEPROM 50 stores various pieces of basic information, including environment setting information, which the system controller 40 refers to when controlling the operation of the electronic camera. The camera power supply section 52 is for supplying power to the individual sections of the electronic camera.

Figure 2:
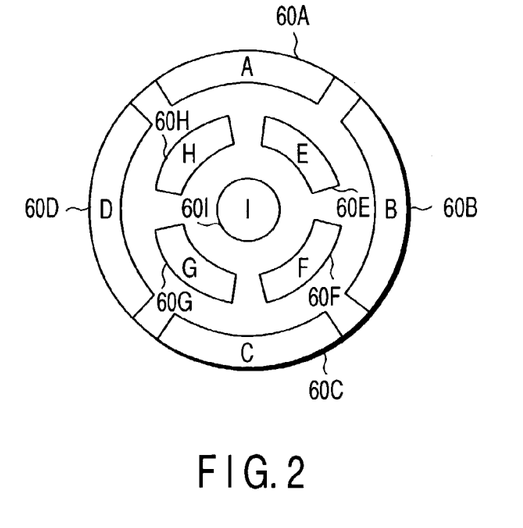
FIG. 2 is a diagram to help explain the allocation of a plurality of electrodes on the reflecting surface of a variable mirror, the electrodes being provided to control the shape of the reflecting surface of the variable mirror included in the electronic camera of the first embodiment.
Figure 3:
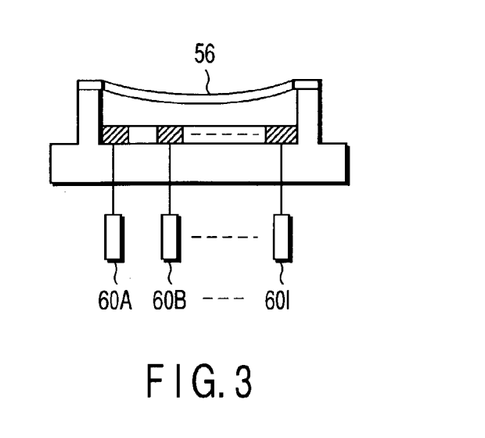
FIG. 3 shows the structure of the variable mirror including a plurality of electrodes the electronic camera of the first embodiment has.

The configuration of the variable mirror 12 will be explained in detail by reference to FIGS. 2 and 3. FIG. 2 is a diagram to help explain the allocation of a plurality of electrodes on the reflecting surface of the variable mirror 12, the electrodes being provided to control the shape of the reflecting surface. FIG. 3 shows the structure of the variable mirror 12 including the plurality of electrodes.

As shown in FIGS. 2 and 3, the variable mirror 12 has a reflecting surface 56 where, for example, a polyimide thin film is coated with aluminum, and nine electrodes 60A to 60I. When a voltage is applied between the plurality of electrodes and the thin film, electrostatic force causes the thin film to deform, with the result that the shape of the reflecting surface changes. Controlling the magnitude of each of the voltages applied to the nine electrodes enables the shape of the reflecting surface to be changed freely. Even when the electrodes are set free after the voltages are applied to them, the voltages are held for a specific time.

Since recent electronic cameras show a strong tendency to be more compact and lighter, it is not practical to provide a power supply circuit for each of the nine electrodes 60A to 60I to apply a desired voltage to the electrodes. Therefore, the electronic camera of the first embodiment causes the mirror power supply section 44 to generate an output voltage (ramp signal) that makes a continuous, monotonous change. The mirror control section 42 performs control in such a manner that it applies the power generated by the mirror power supply section 44 to the plurality of electrodes at the time that the power has reached a value required by the corresponding electrode.

Hereinafter, the way the mirror control section 42 and mirror power supply section 44 supply power will be explained in detail.

Figure 4:
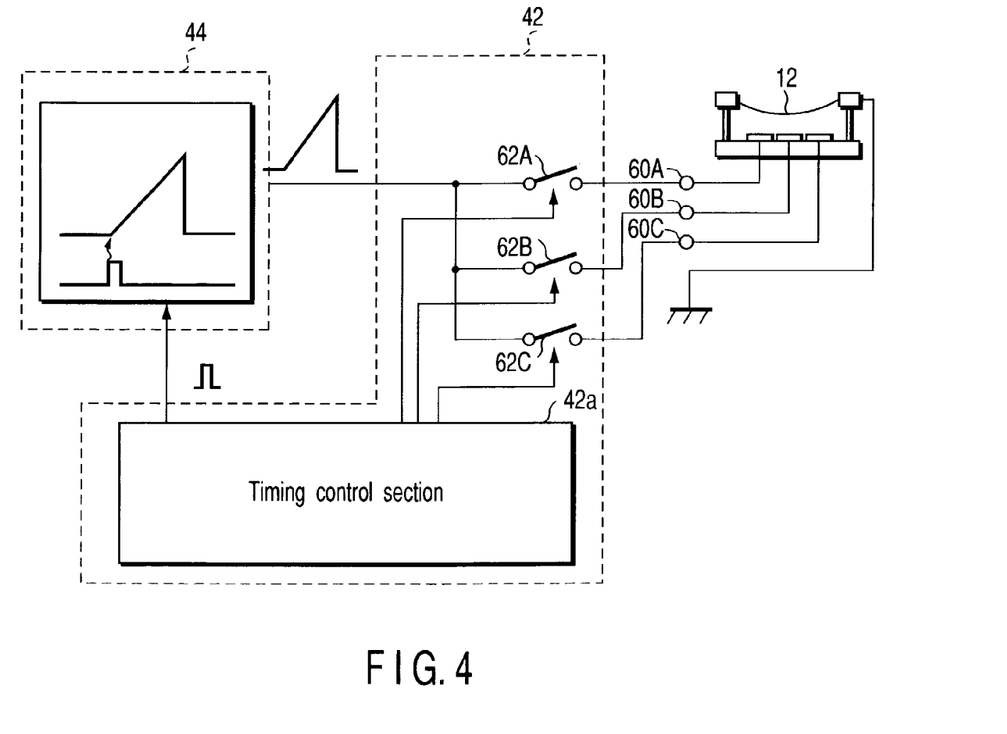
FIG. 4 is a conceptual diagram to help explain the principle of power supply control of the variable mirror carried out in the electronic camera of the first embodiment.

FIG. 4 is a conceptual diagram to help explain the principle of power supply control of the variable mirror 1 carried out in the electronic camera of the first embodiment.

To simplify the explanation, suppose a case where the shape of the reflecting surface of the variable mirror 12 is controlled by three electrodes 60A to 60C. The mirror control section 42 for controlling the shape of the reflecting surface includes three switches 62A to 62C for connecting and disconnecting each electrode of the variable mirror 12 to and from the mirror power supply section 44, that is, for applying a voltage to each electrode or bringing each electrode into an open state. The mirror power supply section 44 includes a one-shot power supply function of generating a continuously and monotonously changing output voltage (ramp signal) only once, in response to the instruction from the mirror control section 42.

The switches 62A to 62C may be composed of, for example, p-n-p bipolar transistors for power supply control or p-channel power MOS transistors.

To control the shape of the reflecting surface of the variable mirror 12, the mirror control section 42 instructs the mirror power supply section 44 to generate a continuously and monotonously changing output voltage (one-shot trigger). At the same time, the mirror control section 42 drives the switches 62A to 62C into a connected state.

Receiving the instruction, the mirror power supply section 44 generates a continuously and monotonously changing output voltage (ramp signal) only once. Then, when the output voltage has reached a value required by any one of the electrodes, the mirror control section 42 drives the switches 62A to 62C in such a manner that it disconnects the electrode from the mirror power supply voltage 44. The input of a one-shot trigger to the mirror power supply section 42 and the driving of the switches 62A to 62C are carried out by a timing control section 42a provided in the mirror control section 42.

The driving timing of the switches 62A to 62C by the timing control section 16a is specified by the system controller 40. Information for getting the timing is stored in the EEPROM 50 by the system controller 40. The information is held in table form in such a manner that, for example, the amount of displacement of the shape of the reflecting surface of the variable mirror 12 is caused to correspond to the time during which the switches 62A to 62C are held in the connected state as follows:

Displacement (P0)
: Switches 62A (0 ms), 62B (0 ms), 62C (0 ms) Displacement (P1)
: Switches 62A (5 ms), 62B (10 ms), 62C (30 ms) Displacement (P2)
: Switches 62A (20 ms), 62B (70 ms), 62C (80 ms)

For example, if the amount of displacement of the shape of the reflecting surface of the variable mirror 12 is P1, the switches 62A to 62C in the system controller 40 are brought into the connected state at the same time when a one-shot trigger is inputted and, 5 ms later, the switch 62A is disconnected. An instruction is given to the timing control section 42a so that the switch 62B may be disconnected 10 ms later and further the switch 62C may be disconnected 30 ms later.

Figure 5:
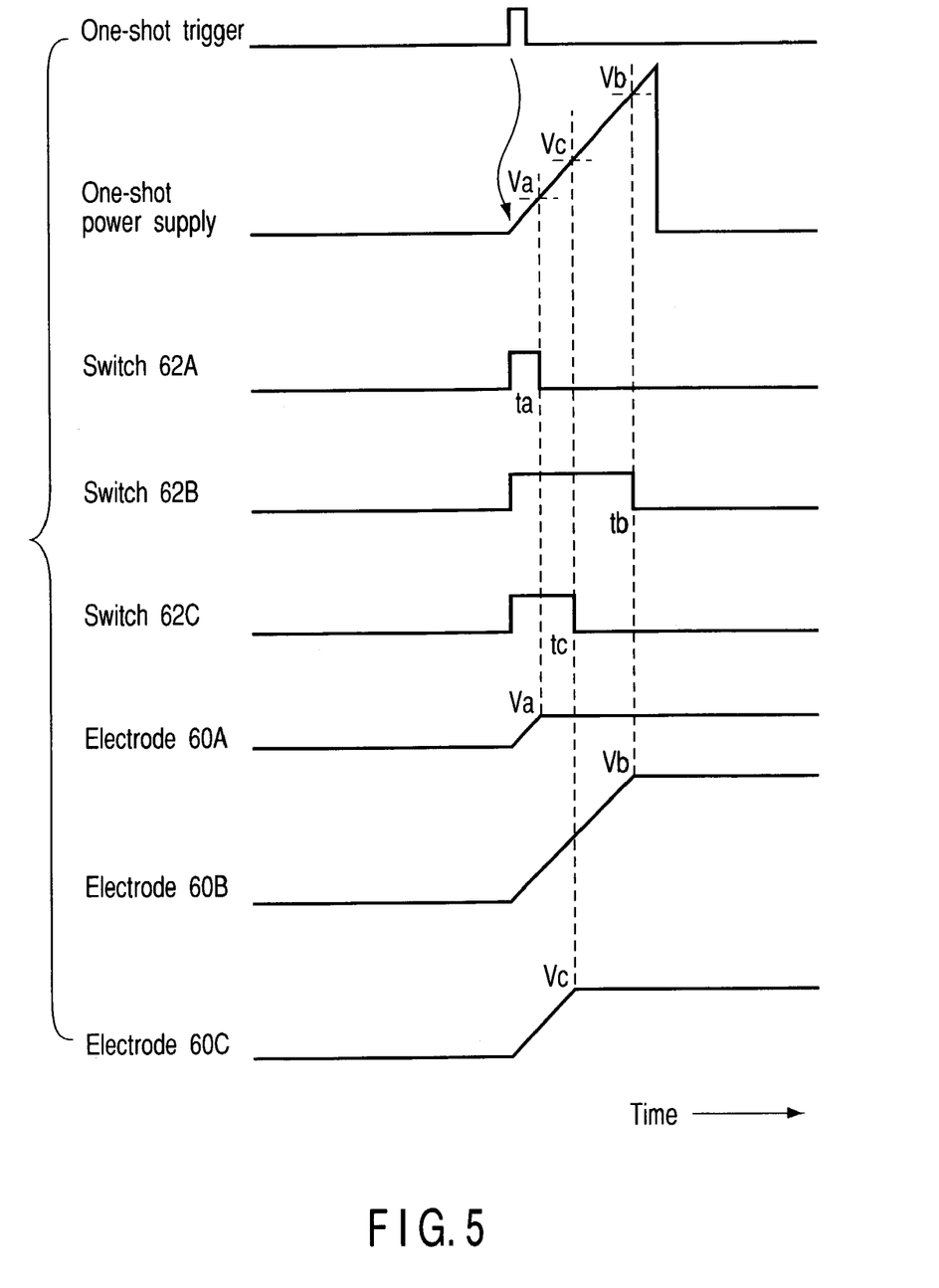
FIG. 5 is a timing chart showing an example of the operating procedure for power supply control of the variable mirror performed in the electronic camera of the first embodiment.

FIG. 5 is a timing chart showing an example of the operating procedure for power supply control of the variable mirror 12 performed in the electronic camera of the first embodiment.

The mirror control section 42 supplies a one-shot trigger to the mirror power supply section 44 and, at the same time, the switches 62A to 62C are driven into the connected state.

Receiving the one-shot trigger, the mirror power supply section 44 starts to generate a continuously and monotonously changing output voltage (ramp signal).

Thereafter, the mirror control section 42 drives the switch 62A into the disconnected state at the time of timing ta. The switch 62C is driven into the disconnected state at the time of timing tc. Furthermore, the switch 62 is driven into the disconnected state at the time of timing tb.

As a result, voltage Va is applied to the electrode 60A, which holds the voltage. Voltage Vb is applied to the electrode 60B, which holds the voltage. Voltage Vc is applied to the electrode 60C, which holds the voltage. Thus, providing only the mirror power supply section 44, a single power supply circuit, makes it possible to achieve the desired object. That is, a power supply method which makes the circuit size smaller and has a good controllability is realized.

While in the first embodiment, the driving timing of the switches 62A to 62C has been obtained from the information stored in the EEPROM 50, this invention is not limited to this. For instance, a circuit for sensing the output voltage of the mirror power supply circuit 44 may be provided separately and, on the basis of the result of the sensing, the driving timing of the switches 62A to 62C may be obtained.

With such a configuration, proper voltages according to the output voltages may be applied to the individual electrodes.

Next, a second embodiment of the present invention will be explained.

Figure 6:
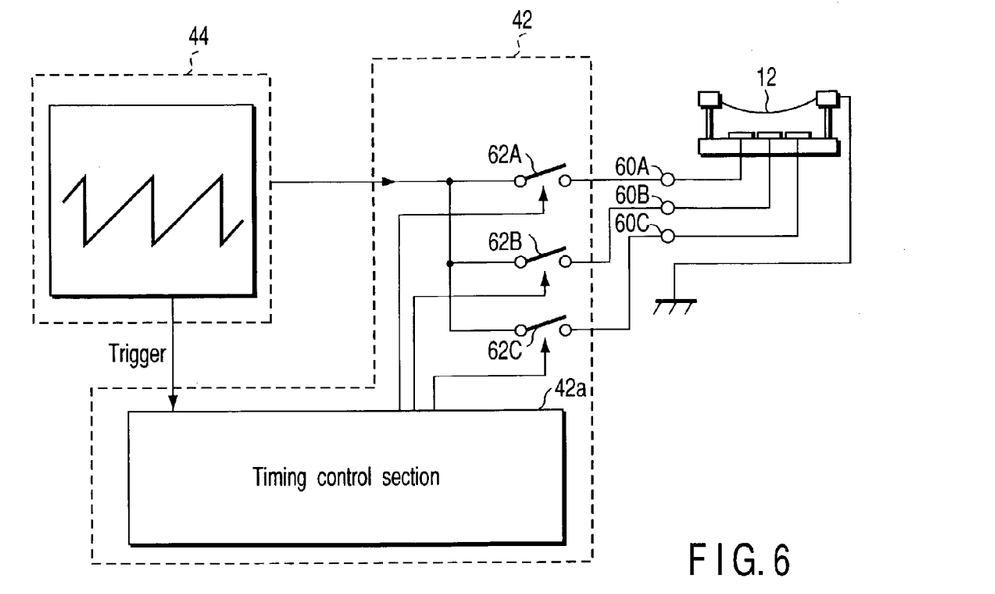
FIG. 6 is a conceptual diagram to help explain the principle of power supply control of the variable mirror carried out in the electronic camera according to a second embodiment of the present invention.

FIG. 6 is a conceptual diagram to help explain the principle of power supply control of the variable mirror 12 carried out in the electronic camera of the second embodiment.

The second embodiment differs from the first embodiment in that the mirror power supply section 44 has a triangular wave power supply function of generating repeatedly a continuously and monotonously changing output voltage in place of the one-shot power supply function and that, each time the mirror power supply section 44 starts to generate the output voltage, the start timing is notified to the mirror control section 42 (trigger).

In the mirror control section 42, when the shape of the reflecting surface of the variable mirror 12 is controlled, the switches 62A to 62C are driven in synchronization with the input of a trigger from the mirror power supply section 44.

Figure 7:
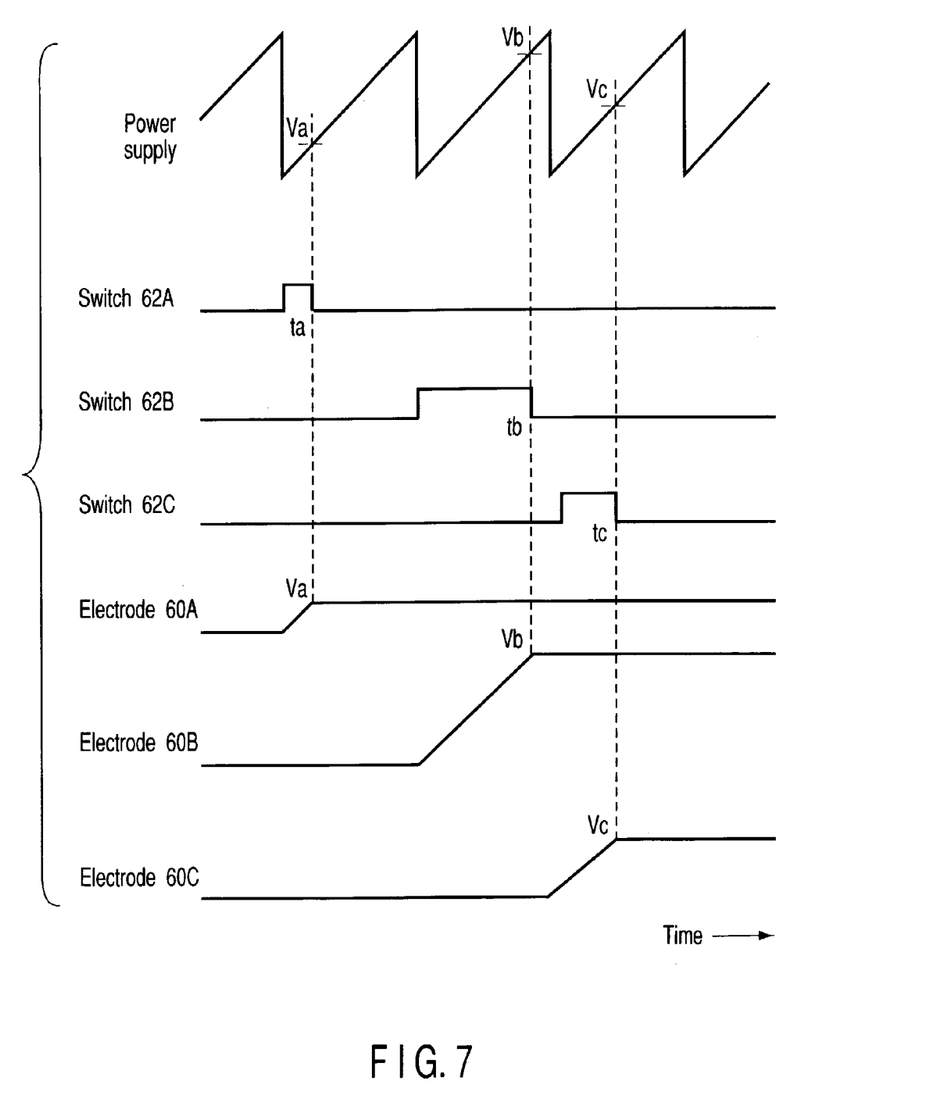
FIG. 7 is a timing chart showing an example of the operating procedure for power supply control of the variable mirror performed in the electronic camera of the second embodiment.

FIG. 7 is a timing chart showing an example of the operating procedure for power supply control of the variable mirror 12 performed in the electronic camera of the second embodiment.

The mirror power supply section 44 generates a continuously and monotonously changing output voltage repeatedly and, at the same time, inputs to the mirror control section 42 a trigger to inform the mirror control section 42 of the start timing of the output voltage. On the other hand, in the mirror control section 42, after the switch 62A is driven into the connected state at the time of the trigger input, the switch 62A is driven into the disconnected state at the time of timing Ta. Furthermore, in the mirror control section 42, after the switch 62B is driven into the connected state at the time of the next trigger input, the switch B is driven into the disconnected state at the time of timing b. Moreover, in the mirror control section 42, after the switch 62C is driven into the connected state at the time of a trigger input after next, the switch 62C is driven into the disconnected state at the time of timing 62c.

As a result, voltage Va is applied to the electrode 60A, voltage Vb is applied to the electrode 60B, and voltage Vc is applied to the electrode 60C. Thus, as in the first embodiment, providing only the mirror power supply section 44, a single power supply circuit, makes it possible to achieve the desired object. That is, a power supply method which makes the circuit size smaller and has a good controllability is realized.

While in the second embodiment, the mirror power supply section 44 has produced voltages Va to Vc applied to the electrodes 60A to 60C on the basis of the output voltages generated with different timings, this invention is not limited to this. For instance, when a plurality of electrodes need the same voltage, it is desirable that they should be obtained with the same timing. Even when different voltages are needed, it is possible to obtain all of the voltages with the same timing according to a similar manner to the procedure explained in the first embodiment.

With such a configuration, it is possible to apply a proper voltage corresponding to the output voltage to each of the electrodes as in the first embodiment.

Next, a third embodiment of the present invention will be explained.

An electronic camera of the third embodiment, which is obtained by improving the electronic camera of the first or second embodiment, is characterized in that the mirror power supply section 44 is configured so as to share a part of the flash light-emitting section 46.

Figure 8:
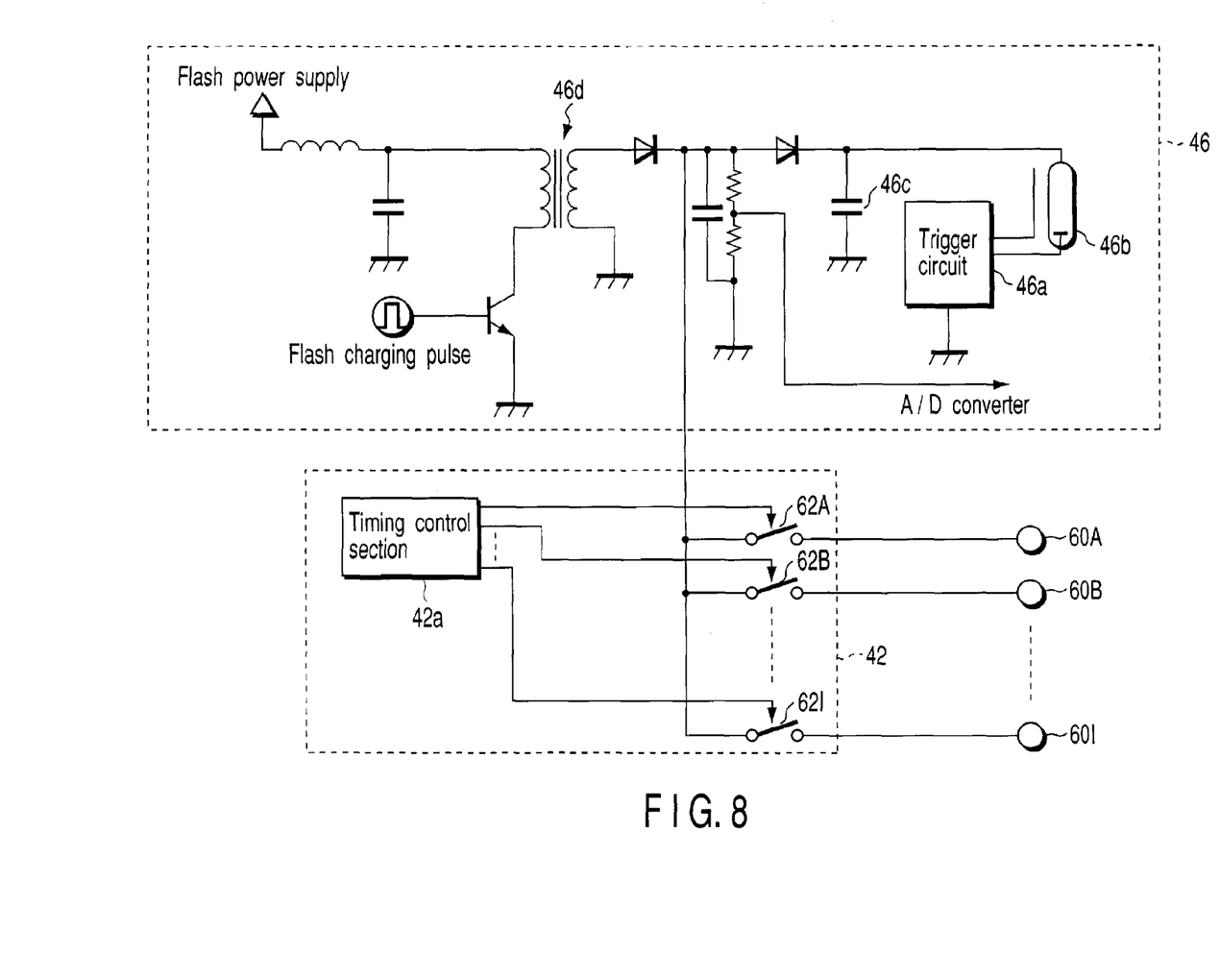
FIG. 8 shows the configuration of the mirror power supply section and flash light-emitting section in an electronic camera according to a third embodiment of the present invention.

FIG. 8 shows the configuration of the mirror power supply section 44 and flash light-emitting section 48 in the electronic camera of the third embodiment.

The flash light-emitting section 46 includes a large-capacity capacitor 46c for causing a xenon tube 46b connected to a trigger circuit 46a to emit light. To charge the large-capacity capacitor 46c, for example, a voltage as high as, for example, 330V is needed. To overcome this problem, the flash light-emitting section 46 includes a step-up power supply circuit 46d for raising the output voltage of the flash power supply much lower than 330V.

The step-up power supply circuit 46d continues to raise the output voltage of the flash power supply, while it is receiving a flash charging pulse. That is, the generation of the flash charging pulse is continued, thereby generating a continuously and monotonously changing output voltage (ramp signal). Then, use of the output voltage thus generated enables the desired voltage to be applied to the electrodes 60A to 60C as explained in the first and second embodiments.

As described above, with the electronic camera of the third embodiment, the mirror power supply section 42 is configured so as to share a part of the flash light-emitting section 46, thereby realizing the further miniaturization of the circuit size.

According to each of the above embodiments, each time a continuously and monotonously changing output voltage (ramp signal) of a specific value has to be applied to the electrode, the voltage is generated only once, which achieves further power saving. On the other hand, generating the voltage at specific intervals makes it possible to accurately deal with a case where the voltage applied to each electrode has to be changed frequently.

Furthermore, the driving timing of the switches for taking out a voltage of a given value from the continuously and monotonously changing output voltage is stored in the memory. The switches are driven using the data stored in the memory. By doing this, no complex calculation is needed, which enables the approach to be applied to an inexpensive product. Use of a sensor would make it possible to take out a very accurate voltage completely unaffected by the operating state at that time.

In addition, when a plurality of electrodes need the same voltage value, the output voltage is applied to the electrodes at the same time, thereby enabling the switches to be driven efficiently.

Moreover, applying the power supply apparatus to a camera with a variable shape mirror enables the single power supply apparatus to supply voltages of various values to a plurality of electrodes provided so as to change the shape of the reflecting surface of the variable shape mirror. As a result, not only does the cost not rise, but also neither the mounting area nor the power consumption increase. In addition, sharing a part of the flash step-up power supply circuit for illuminating the subject decreases the number of parts, which reduces the cost and makes the size smaller.

Next, a fourth embodiment of the present invention will be explained.

Figure 9:
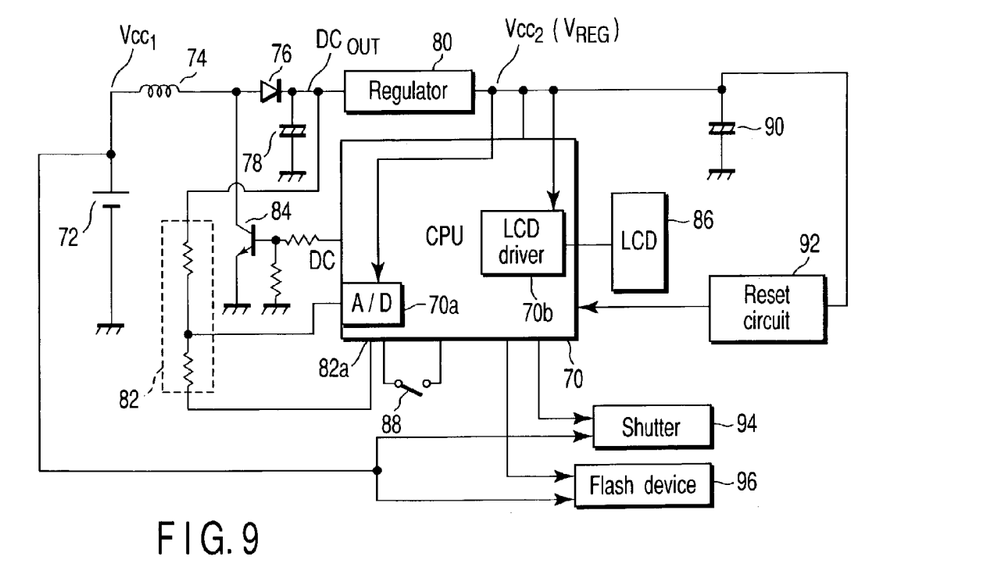
FIG. 9 shows the configuration of a power supply circuit according to a fourth embodiment of the present invention.

FIG. 9 shows the configuration of a power supply circuit of the fourth embodiment.

In the fourth embodiment, explanation will be given taking as an example a camera that includes more moving parts, including actuators, and imposes a heavier burden on the battery than the remaining portable electronic equipment.

In FIG. 9, a CPU 70, which controls the sequence of the whole camera, is composed of a microcontroller. The CPU 70 includes an A/D converter 70a and an LCD driver 70b, which will be explained later.

A battery 72 serves as an energy source for a shutter 94 and a flash device 96, which will be explained later. The battery 72 is composed of a primary battery, such as a lithium battery or an alkaline battery, or in recent years, a second battery, such as NiH or Lithium ion. The battery 72 is connected to the CPU 70 via an inductor 74, a rectifying diode 76, a power stabilizing capacitor 78, and a regulator 80.

Also connected to the CPU 70 are a voltage dividing resistance 82 composed of two resistances, a transistor 84, an LCD 86 driven by the LCD driver 70b, a switch 88, a capacitor 90, a reset circuit 92, the shutter 94, and the flash device 96.

With this configuration, as the user controls the switch 88, a specific sequence is carried out according to the program built in the CPU 70. As a result, the shutter 94 and flash device 96 are driven, thereby controlling the imaging operation and display. The battery 72 is used as an energy source for the shutter 94 and flash device 96.

When the battery is used, the resistance component called the internal resistance cannot be ignored. If current of the order of several hundreds of milliamperes flows through a plunger or a motor (not shown) for the shutter 94, or if current of the order of several amperes flows through a charging circuit (not shown) for the flash device 96, the internal resistance causes a voltage drop. Then, the battery voltage changes or drops rapidly, with the result that the CPU 70 may malfunction or go beyond the lowest operating voltage and stop.

The internal resistance component varies according to the ambient temperature, the used or consumed state of the battery, the type of the battery, or the maker. It is desirable that the CPU and the other sections should be controlled at a constant voltage, regardless of the internal resistance component.

For this reason, in the fourth embodiment, the CPU 70 turns on and off the DC/DC converter transistor 84 at a high speed by applying a pulse signal to the base of the transistor 84. As a result, a current change occurs in the inductor 74. The current based on the voltage generated at that time is charged in the power-supply stabilizing capacitor 78 via the rectifying diode 76. Then, the voltage at the part indicated by $DC_{OUT}$ in FIG. 9 rises to the battery voltage (Vcc1) or higher. Use of the voltage as a power supply for the CPU 70 makes it possible to produce a power supply unaffected by the aforementioned great fluctuations in the battery voltage.

However, the pulse driving of the transistor 84 is continued unlimitedly and the DC/DC converter continues being driven, with the result that $DC_{OUT}$ rises more than necessary and the drawn current becomes useless. To prevent this, $DC_{OUT}$ is inputted to the regulator 80. The output of the regulator 80 is used as the power supply voltage Vcc2 of the CPU 70.

If the open voltage of the battery is 3V, the regulator output Vcc2 is set at about 2.7V. This stops the DC/DC converter and suppresses the consumption of the current, when the battery is new and the large-current circuitry is not driven.

As described above, using the stabilized regulator output Vcc2 as a reference voltage for the LCD driver 70b and A/D converter 70a built in the CPU 70 enables not only the concentration of the LCD 86 to be made constant, regardless of the consumed state of the battery, but also an accurate A/D conversion to be made. Furthermore, it is possible to control the CPU 70 stably without exceeding the power supply limit (about 3.6V) of the CPU 70.

When the A/D converter 70a is used, the output $DC_{OUT}$ of the DC/DC converter is divided by the resistance 82, thereby determining whether control of the DC/DC converter is necessary.

Specifically, when the CPU 70 brings an open drain output terminal 82a into the low level, a voltage corresponding to the ratio of the two resistances in the voltage dividing resistance 82 appears at the intermediate electrode. Thus, the voltage is monitored by the A/D converter 70a. When the voltage is not higher than about 2.7V of the regulator output ($V_{REG}$), the DC/DC converter 84 is operated.

When the DC/DC converter 84 is stopped as soon as the voltage has exceeded 2.7V, the CPU 70 consumes the current immediately, with the result that the voltage Vcc2 drops. Therefore, after the raising of the voltage is continued for a while and the voltage rises about 0.5V (or reaches $V_{REG}+V_0$), the DC/DC converter is stopped, thereby suppressing the drawn current.

Figure 10:
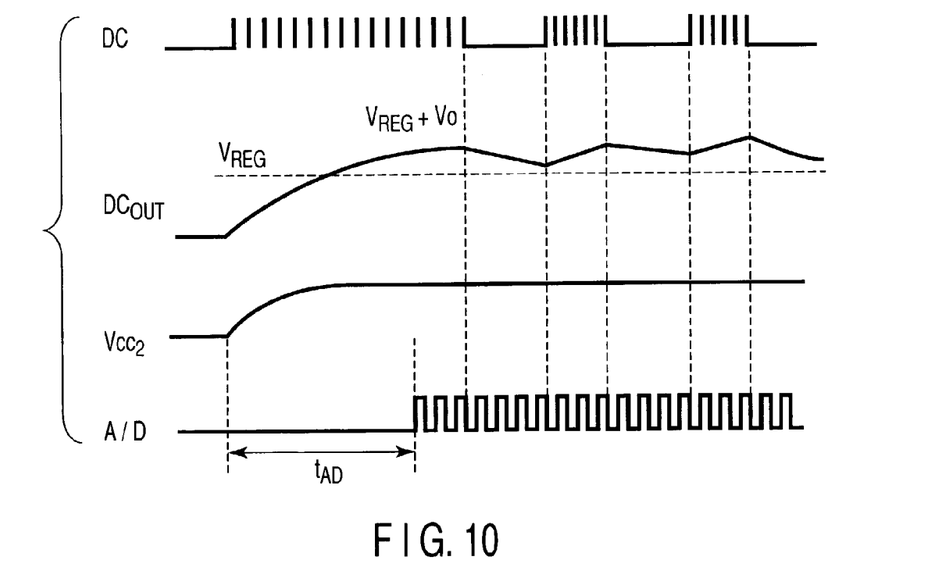
FIG. 10 is a timing chart to help explain the way the power supply circuit of FIG. 9 performs voltage control.

FIG. 10 is a timing chart to help explain the way the power supply circuit performs voltage control.

In FIG. 10, DC represents a pulse waveform for controlling the base of the DC/DC converter transistor 84. $DC_{OUT}$ and Vcc2 represent the input and output of the regulator 80, respectively. Furthermore, A/D denotes the decision timing of the A/D converter 70a.

It should be noted that, since the reference voltage of the A/D converter 70a does not become the correct value when the regulator 80 does not output the regular $V_{REG}$, the determination of A/D conversion is started after the reference voltage becomes the correct value. That is, after a specific time ($t_{AD}$) has elapsed since the DC/DC converter was driven, A/D conversion is made.

Since a voltage decision ($DC_{OUT}$ decision) is made by A/D conversion after the control causes the correct reference voltage to be inputted, DC/DC converter control can be performed accurately. If the battery is removed, the reset circuit 92 determines that the battery has been removed and resets the CPU 70.

The operation of the camera with the power supply circuit configured as described above will be explained by reference to FIG. 11.

Figure 11:
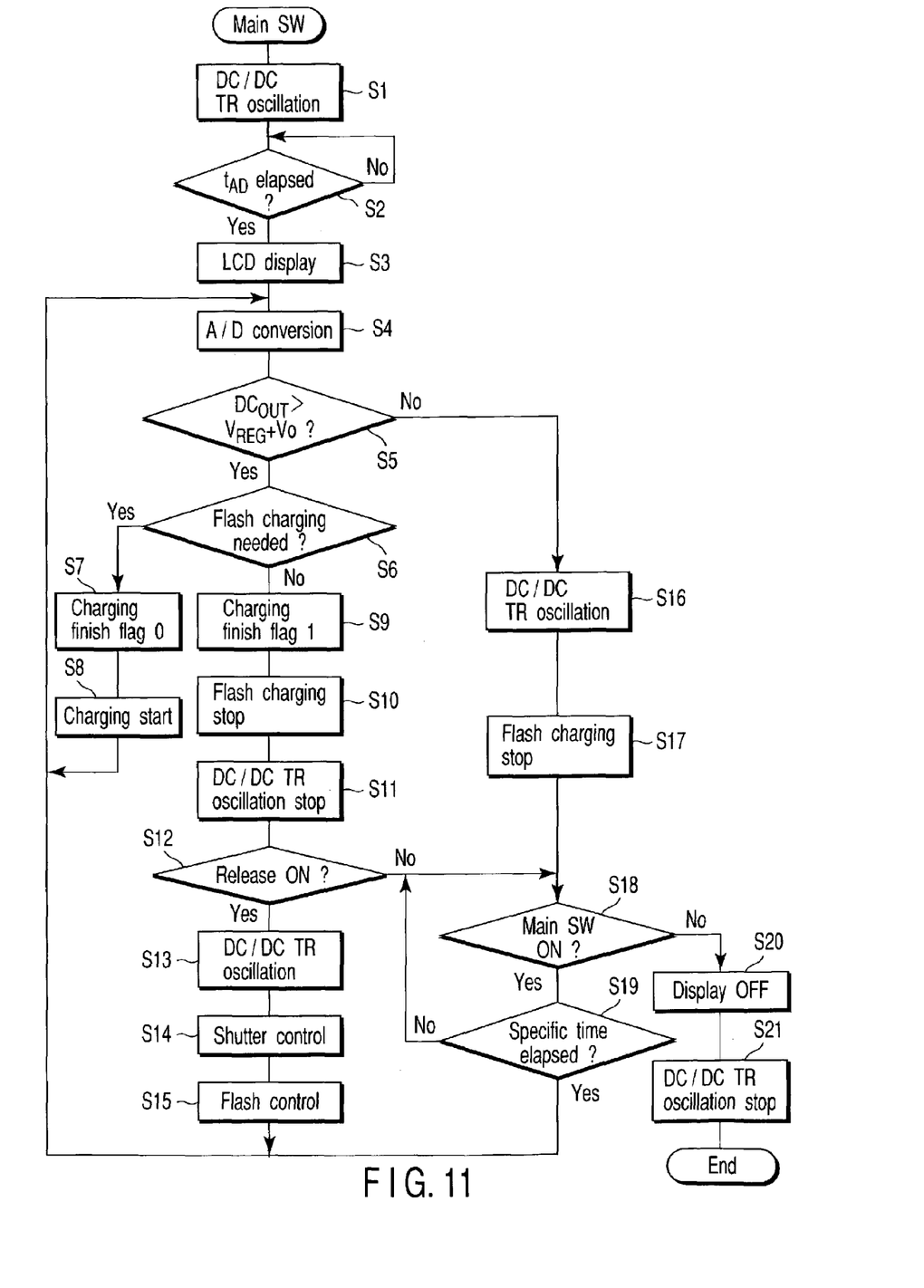
FIG. 11 is a flowchart to help explain the operation of the camera with the power supply circuit of the fourth embodiment.

The flowchart is carried out sequentially according to the program stored in the ROM built in the CPU 70.

When the main switch of the camera is turned on, the oscillation of the DC/DC converter transistor 84 is started in step S1. As described above, since the reference voltage ($V_{ref}$) of the A/D converter 70a built in the CPU 70 can be unstable for a while after the voltage-raising operation, a processing operation is carried out as follows. In step S2, it is determined whether a specific time $t_{AD}$ has elapsed. After the specific time $t_{AD}$ has elapsed, an LCD display is made in step S3. In step S4, an A/D converting operation is started.

In step S5, it is determined whether the result of the A/D conversion has shown the relationship represented by the expression $DC_{OUT}>V_{REG}+V_0$ (a voltage about 0.5V higher than the regulator voltage).

Here, if $DC_{OUT}$ is higher, control proceeds to step S6. Then, if such an operation as flash charging is not needed, it is determined that the operation of the DC/DC converter can be stopped. Then, it is determined whether flash charging is needed. If flash charging is needed, control goes to step S7, where a charging finish flag is made "0." In step S8, a charging operation is started. At this time, since a drop in the battery voltage is expected, the operation of the DC/DC converter is continued, thereby stabilizing the CPU voltage (Vcc2).

In step S6, if flash charging is not needed, control proceeds to step S9, where the charging finish flag is set (to "1"). Then, after the flash charging is stopped in step S10, the DC/DC converter is stopped in step S11, thereby reducing the drawn current.

Generally, a flash circuit requires a charging operation because it carries out the emission of flash light using high-voltage energy, resulting in a great drawn current at that time. In addition, when the release switch is turned on, a great drawn current results from the shutter operation or the like. For this reason, the state of the release switch is determined in step S12. If the release switch is on, control proceeds to step S13, where the DC/DC converter is operated. Then, in step S14, shutter control is performed. In step S15, flash light-emitting control or the like is performed.

After the drawn current operation is completed, control goes to step S4, where A/D conversion is made again. Then, it is determined whether further control of the DC/DC converter is needed.

On the other hand, in step S12, if the release switch is not turned on, control proceeds to step S18.

If the expression $DC_{OUT}>V_{REG}+V_0$ does not hold in step S5, control proceeds to step S16, where the oscillation of the DC/DC converter transistor 84 is continued. In step S17, control of a large drawn current, such as flash charging, is stopped. Then, control goes to S18.

In step S18, the operating state of the main switch is determined. If the main switch is not off, control proceeds to step S19, where the decision (power supply voltage decision) of A/D is made in step S4 each time a specific time has elapsed.

In step S18, if the main switch is turned off, control goes to step S20, where the display of the LCD 86 is turned off. In step S21, the operation of the DC/DC converter is also stopped, thereby reducing the drawn current.

As described above, with the fourth embodiment, the A/D conversion means (or converter) built in the CPU is used effectively to perform on/off control of the DC/DC converter accurately, which assures a stable operation and lengthens the service life of the battery.

Furthermore, the Nch open drain terminal of the CPU 70 performs on/off control of the ground (GND) side of the voltage dividing resistance 82, thereby reducing the number of parts, which enables the power circuit to be used in a small apparatus housed in a small space.

In addition, whenever control of the flash or actuator involves a large drawn current operation, the DC/DC converter is caused to operate, thereby preventing a drop in the Vcc2, which eliminates an erroneous operation and takes measures against the flicker of the display.

Next, a fifth embodiment of the present invention will be explained.

Figure 12:
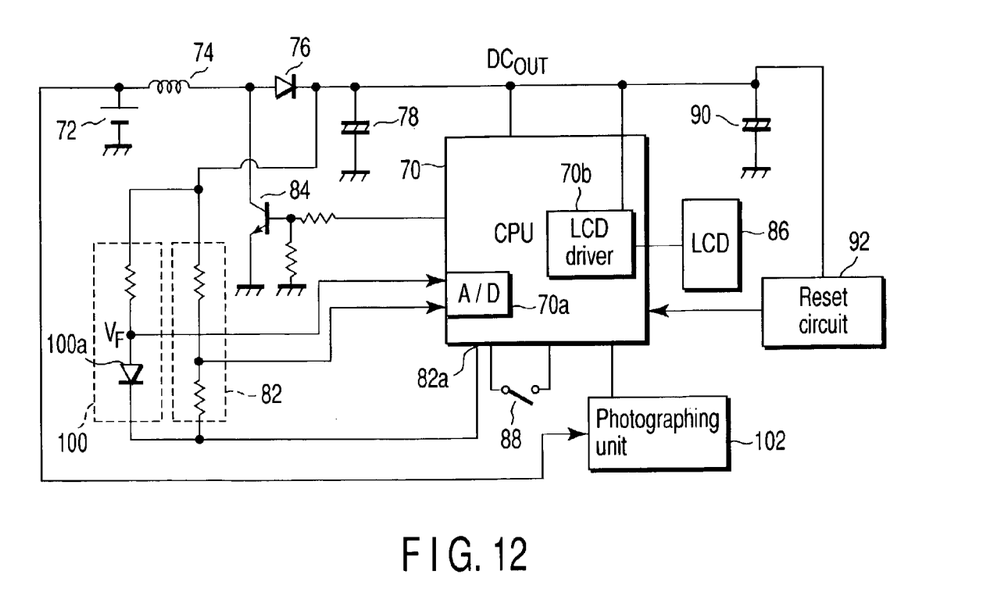
FIG. 12 shows the configuration of a power supply circuit according to a fifth embodiment of the present invention.

FIG. 12 shows the configuration of a power supply circuit of the fifth embodiment.

In the fifth embodiment, the same parts as those in the fourth embodiment of FIG. 9 are indicated by the same reference numerals and explanation of them will be omitted.

In the fifth embodiment, since the forward voltage $V_F$ for a diode 100a in a voltage dividing circuit 100 is used as the $V_{ref}$ of the A/D converter, the regulator 80 is eliminated from the configuration of FIG. 9, achieving a less expensive circuit.

Figure 13:
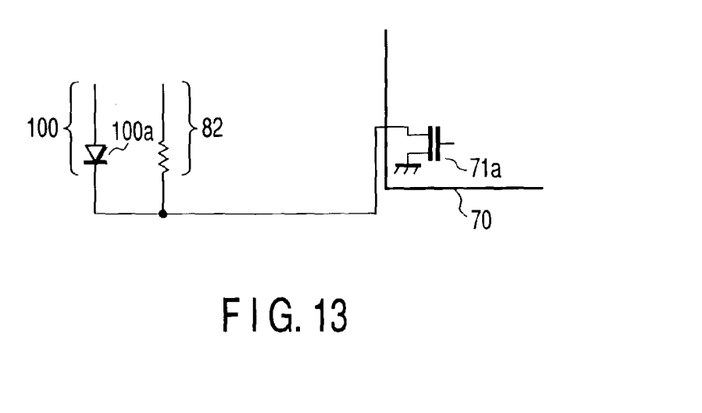
FIG. 13 is a diagram to help explain the time at which the voltage of the power supply circuit of the fifth embodiment is raised is determined.

Specifically, the A/D converter 70a can determine whether the voltage raising is necessary by comparing the $V_F$ with the output of the DC/DC converter divided by the voltage dividing resistance 82. As shown in FIG. 13, only when the determination is made, the open drain port 71a of the CPU 70 is turned on, causing current to flow in the voltage decision section composed of a diode and a resistance. In the other time, the voltage decision section is made open, thereby suppressing the drawn current.

If on/off control of the DC/DC converter is frequently performed on the basis of the voltage comparison by the A/D converter 70a, $DC_{OUT}$ can be suppressed to 0.3 to 0.4V, a variation 3 to 4 times the difference of 0.1V, since $V_F$ of the diode 100a is generally 0.6 to 0.7V.

With this configuration, a drop in the power supply voltage caused by a photographing unit 102, including a shutter and a flash device, is prevented, while the LCD 86 is being driven at a specific voltage minimizing the flicker. In the fifth embodiment, the regulator is eliminated, which reduces the cost.

Next, a sixth embodiment of the present invention will be explained.

Figure 14:
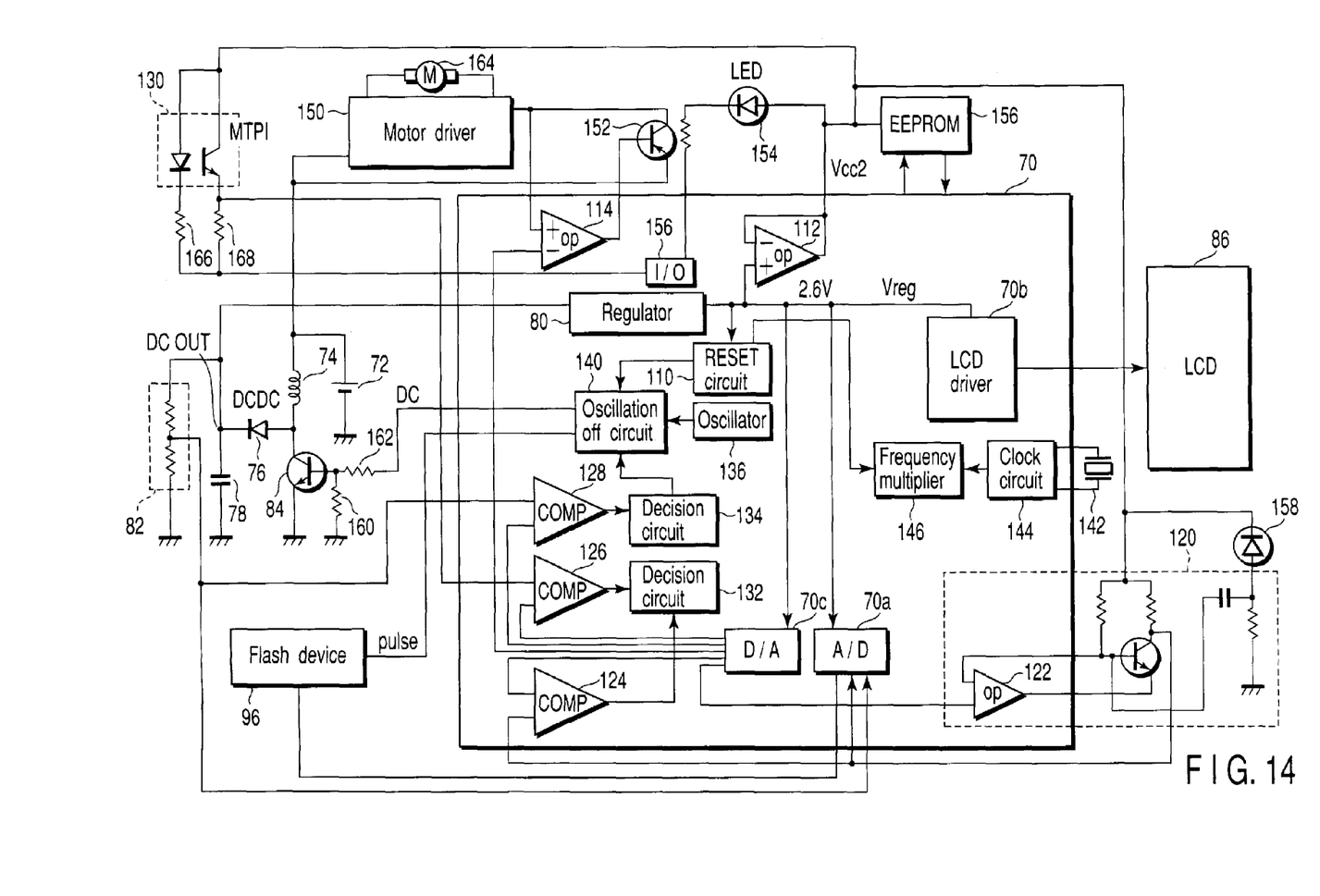
FIG. 14 is a block diagram of a power supply circuit according to a sixth embodiment of the present invention, which shows a configuration of the entire camera system to which the power supply circuit is applied.

FIG. 14 is a block diagram of a power supply circuit of the sixth embodiment, which shows a configuration of the entire camera system to which the power supply circuit has been applied.

The sixth embodiment is an example of the regulator 80 built in the same chip of the one-chip microcomputer (CPU) 70. The output of the regulator 80 not only is supplied to the A/D converter 70a, the LCD driver 70b, a D/A converter 70c, a reset (RESET) circuit 110, but also is drawn outside the CPU 70 via a buffer 112.

Connected to the D/A converter 70c are not only an amplifier 114 and an amplifier 112 included in an AF (autofocus) section 120 but also one input terminal of each of comparators 124, 126, and 128. The A/D comparator 70a and AF section 120 are connected to the other input terminal of the comparator 124. The other input terminals of the comparators 126, 128 are connected to a photo interrupter circuit 130 and a voltage dividing resistance 82, respectively. Then, the outputs of the comparators 124 and 126 are supplied to a decision circuit 132. The output of the comparator 128 is supplied to a decision circuit 134.

The output of the decision circuit 134 is supplied together with the output of the reset circuit 110 and the output of an oscillator 136 to an oscillation off (OFF) circuit 140. A clock circuit 144 to which an oscillator 142 outside the CPU 70 is connected is connected to the reset circuit 110 via a frequency multiplier 146.

Furthermore, a transistor 152 for a motor driver 150 is connected between the input and output of the amplifier 114. An I/O section 156 is connected via a display LED 154 connected to the buffer 112.

The diode 76 and capacitor 78 in the DC/DC converter are connected to the regulator 80 in the CPU 70. The motor driver 150 and the transistor 152 are connected via the inductor 76 and capacitor 78 to the diode 76. The oscillation off circuit 140 is also connected to the diode 76 via the transistor 84 and resistances 160, 162. The flash device 96 is also connected to the oscillation off circuit 140.

The rotation of a motor 164 connected to the motor driver 140 is sensed by a photo interrupter circuit 130. The photo interrupter circuit 130 is connected not only to the I/O section 156 via resistances 166, 168 but also to the inside of the CPU 70, the EEPROM 156, the AF section 120, and a light-receiving element 158.

The LCD 86 is connected to the LCD driver 70b in the CPU 70. The LCD driver 70b drives the LCD 86.

With such a configuration, the way the output of the battery is stabilized and used as a power supply will be explained.

The regulator 80 is built in the same chip of the CPU 70. The output of the regulator 80 is designed to be able to be drawn outside the CPU 70 by way of the buffer 112. The voltage depending on the output $DC_{OUT}$ of the DC/DC converter is inputted via the voltage dividing resistance 82 to the A/D converter 70a and a comparator 138 provided in the CPU 70.

When the CPU 70 causes the built-in oscillator 136 to turn on and off the transistor 84, the voltage in the inductor 74 generated by the current from the battery 72 is charged in the capacitor 78 via the diode 76. The charged voltage $DC_{OUT}$ is divided by the voltage dividing resistance 82 and is monitored by the A/D converter 70a.

A timing chart to help explain the operation of the circuit is the same as that of FIG. 10 except that there is a sequence that cannot be dealt with sufficiently by such a program as is always monitoring the result of the A/D converter 70a. Specifically, when high-speed control is performed for a relatively long time, the time required to determine the A/D conversion becomes a time lag, which makes accurate control impossible. For instance, when stamp timing is determined in stamping a date on film, or when the lens position is sensing in controlling the focusing lens, it is difficult to monitor a rise in the voltage of the DC/DC converter.

To overcome this problem, the comparator 128 for comparing specific voltages DA1 and DA2 is provided in the sixth embodiment. When $DC_{OUT}$ has reached a specific level, the decision circuit 134 turns off the oscillation off circuit 140, thereby stopping the voltage raising operation.

The oscillation off circuit 140 is configured not only to just stop oscillation, but also to bring the output voltage into the low level, while the oscillation is stopped, in order to prevent the transistor 84 from being kept on.

With such a circuit, control can be performed so that $DC_{OUT}$ may fit in a specific level.

Figure 15:
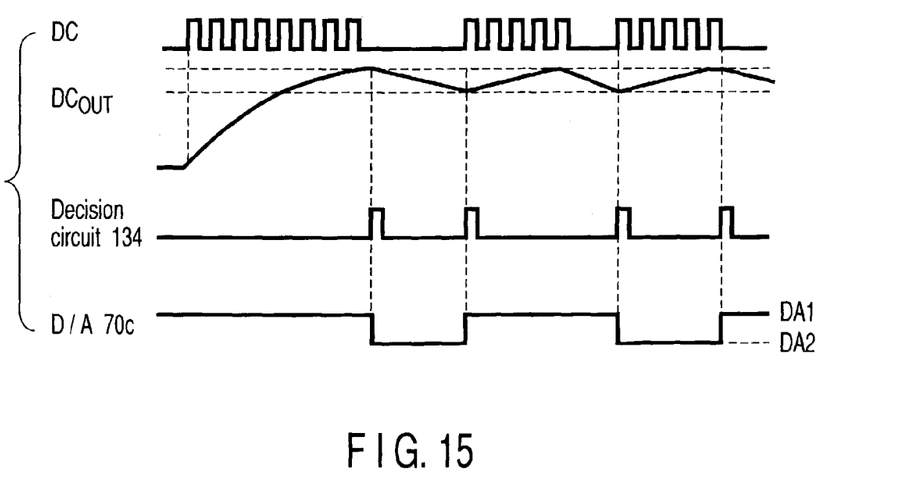
FIG. 15 is a timing chart to help explain the operation of each section in raising the voltage in the system of FIG. 14.

The D/A converter 70c can switch the decision voltage inputted to the comparator 128 according to the program in the CPU 70. As shown by DA in the timing chart of FIG. 15, the D/A converter 70c can select the two outputs of DA1 an DA2. When the voltage is raised, the upper limit DA1 is set. When the raising of the voltage is stopped, the lower limit DA2 is set. Each time these values are exceeded, the decision circuit 134 determines the output of the comparator 128 and outputs a signal, thereby switching the oscillation off circuit 140 or the program in the CPU 70. A timing chart for control at that time is shown in FIG. 15.

As described above, the single comparator is also caused to function as a window comparator, which prevents the circuit from becoming large uselessly and reduces the cost.

The output of the regulator 80 in the CPU 70 characterizing the sixth embodiment is supplied to the D/A converter 70c, A/D converter 70a, and LCD driver 70b as a reference voltage. At the same time, the output of the regulator 80 functions as a constant voltage source for each circuit outside the CPU 70 by way of the buffer 112. For instance, the output of the regulator 80 becomes a power supply for the photo interrupter circuit 130 for sensing the rotation of the motor 164, the display LED 154, and EEPROM 156 in which various types of data have been recorded.

Although not shown, the output of the regulator 80 may be used as a power supply for stabilizing the AF section 120 that senses the magnitude of the optical signal entering the light-receiving element 158, when the projection of light projecting means is controlled.

Furthermore, the output pulse of the oscillator 136 is also used as a charging pulse for the flash device 96. The A/D converter 70a built in the CPU 70 also has the function of determining the charging voltage. The output of the D/A converter 70c is inputted to the amplifier 114. The amplifier 144, together with the transistor 152, drives the motor driver 150, thereby controlling the speed of the motor 164.

As described above, the oscillator 136 operates the date stamping clock circuit 144. The output of the oscillator 136 is multiplied by the frequency multiplier 146, thereby generating a main clock for the operation of the CPU 70.

The reset circuit 110 has the function of, when the battery 72 is consumed, resetting the CPU 70, and when the battery 72 is replaced with a new one, restarting the CPU 70 properly.

As described above, with the system of FIG. 14, it is possible to configure not only the AF section 120 but also the main parts in the same chip of the CPU 70, which provides a product with the merit of being lower in cost and occupying a less space.

This invention is not limited to the above embodiments and may be practiced or embodied in still other ways without departing from the spirit or essential character thereof. Furthermore, the above embodiments include various stages of the present invention. Various inventions may be extracted by combining the disclosed components suitably.

As described above, with the present invention, it is possible to provide a power supply apparatus and an actuator control apparatus which not only perform voltage control properly at low cost with a simple configuration, but also draw small current, make the circuit size smaller, and realize a good controllability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power supply circuit comprising:
   a switching section which causes current to flow from a battery to an inductor repeatedly;
   a smoothing circuit which smoothes a voltage generated at the inductor and inputs the smoothed voltage to a regulator;
   a monitor circuit which monitors the output of the smoothing circuit, with a reference voltage of the monitor circuit being stabilized by the output voltage of the regulator;
   a control section which controls the activation or inactivation of pulse generation of the switching section on the basis of the result of the monitoring by the monitor circuit, wherein the control section is composed of a microcontroller; and
   pulse generating section sets a specific register in the microcontroller for the switching section, thereby making use of a pulse generating function of generating or stopping pulses with a specific on/off ratio.

2. The power supply circuit according to claim 1, wherein the monitor circuit is composed of a comparator or a D/A converter which inputs a reference voltage to the comparator.

3. The power supply circuit according to claim 1, wherein the regulator is configured on the same chip as the pulse generator circuit which provides switching control of the inductor.

4. A power supply circuit comprising:
   a microcontroller with the function of controlling the oscillation of a pulse signal with a specific pulse width;
   a DC/DC converter which uses a battery controlled by the generated pulse signal as a power supply;
   a regulator which converts the output of the DC/DC converter into a low voltage, wherein
   after a specific time has elapsed since the output of the pulse signal, the microcontroller compares the output of the regulator with the output of the DC/DC converter, thereby controlling the pulse signal.

* * * * *